United States Patent [19]

Hannon et al.

[11] Patent Number: 4,922,645

[45] Date of Patent: May 8, 1990

[54] MAGNETIC FISHING HOOK GUARD AND METHOD

[75] Inventors: Douglas Hannon, Odessa, Fla.; Bingham A. McClellan, Traverse City, Mich.

[73] Assignee: McClellan Industries, Inc., Traverse City, Mich.

[21] Appl. No.: 396,302

[22] Filed: Aug. 21, 1989

Related U.S. Application Data

[62] Division of Ser. No. 105,291, Oct. 5, 1987, Pat. No. 4,878,310.

[51] Int. Cl.$^5$ ............................................. A01K 83/00
[52] U.S. Cl. ...................................... 43/42.4; 43/43.2
[58] Field of Search ................... 43/42.4, 43.16, 43.2, 43/43.8, 43.4

[56] References Cited

U.S. PATENT DOCUMENTS

| | | | |
|---|---|---|---|
| 454,580 | 6/1891 | Mack | 43/43.2 |
| 2,102,492 | 12/1937 | Stolley | 43/42.36 |
| 2,124,263 | 7/1938 | Schott | 43/43.2 |
| 2,497,473 | 2/1950 | Slepica | 43/42.48 |
| 2,513,397 | 7/1950 | Bemis | 43/43.2 |
| 2,517,298 | 8/1950 | Gaylord | 43/42.04 |
| 2,538,484 | 1/1951 | Tenn | 43/42.39 |
| 2,556,205 | 6/1951 | McRoberts | 43/42.48 |
| 2,871,608 | 2/1959 | Fisher | 43/35 |
| 3,218,750 | 11/1965 | Lewin | 43/42.36 |
| 3,492,752 | 2/1970 | Viveiros | 43/44.8 |
| 3,494,062 | 2/1970 | Gardner | 43/42.04 |
| 4,006,551 | 2/1977 | Messacar | 43/42.04 |

OTHER PUBLICATIONS

Burke Fishing Lures, 1987 catalog, 1969 S. Airport Rd., Traverse City, Mich. 49684, pp. 2, 3 and 5.
Probait., New from Bill Lewis Lures (advertisement), Bassin, Aug./Sep. 1987, p. 25.

*Primary Examiner*—M. Jordan
*Attorney, Agent, or Firm*—Charles M. Kaplan

[57] ABSTRACT

Magnetism is used to reduce the tendency of a fish hook to snag. A magnet may be attachted to a fishing rig, or part of the rig or a hook may be magnetized, so as to attract a movable hook to a relatively shielded position in contact with the rig where the hook is less likely to snag than when it hangs loosely or is free swinging, or magnetism may be used to hold a weed guard in a position where it shields a hook. The strike of a fish can pull the hook free from the magnet or weed guard and enable its point to penetrate the mouth of the fish.

21 Claims, 2 Drawing Sheets

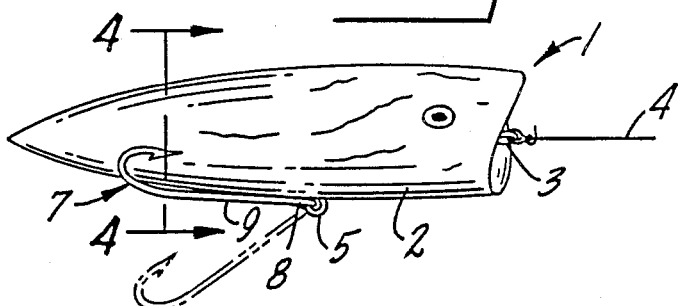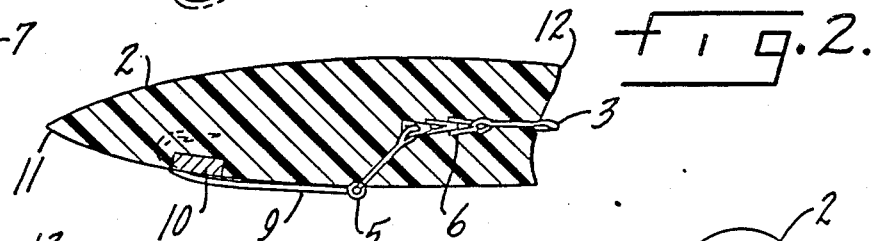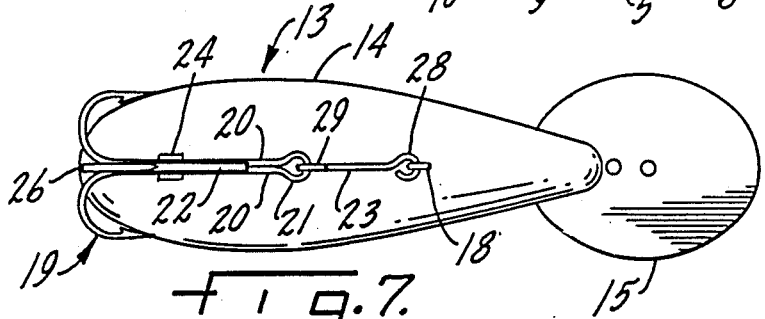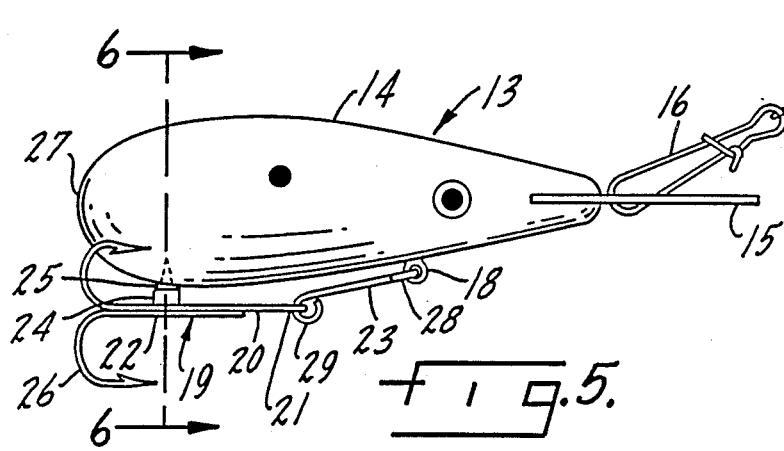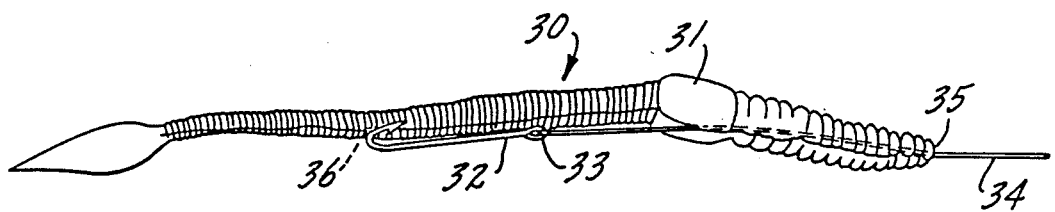

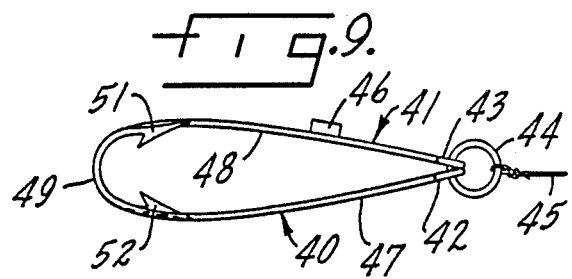
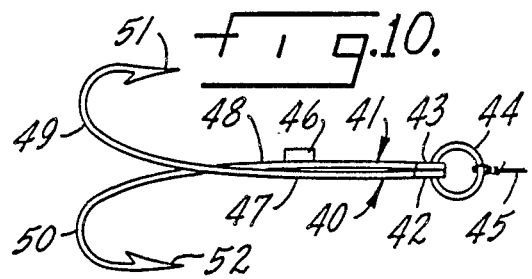
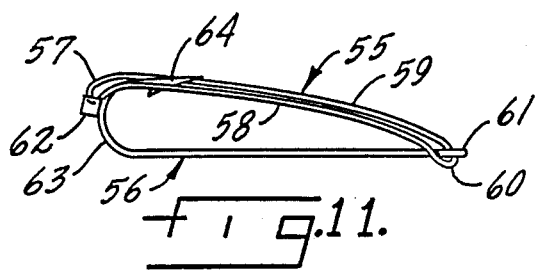
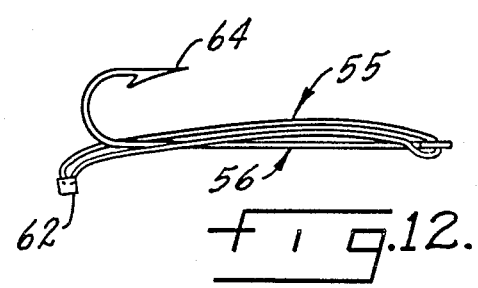
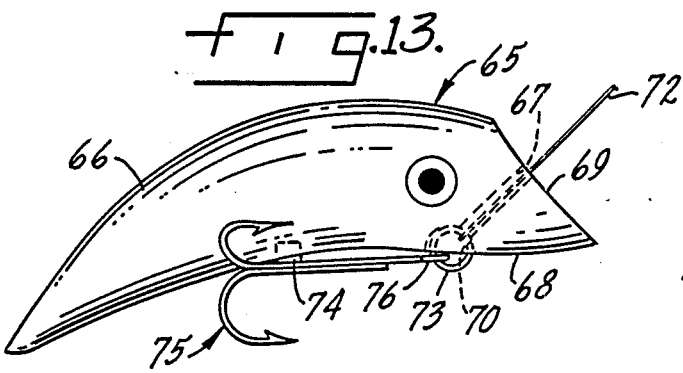
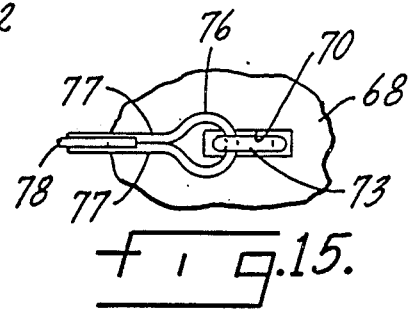
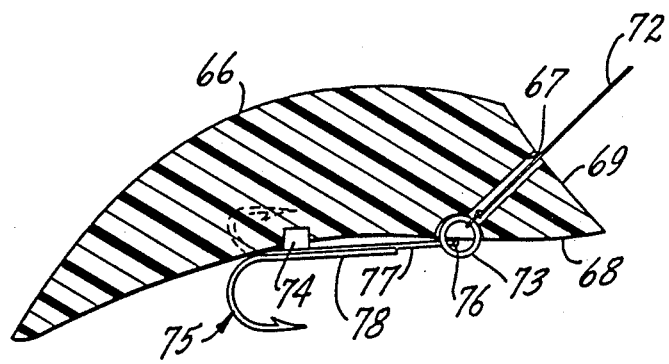
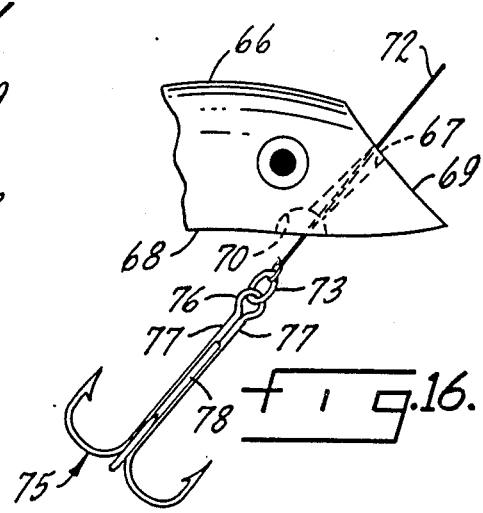

MAGNETIC FISHING HOOK GUARD AND METHOD

BACKGROUND OF THE INVENTION

This application is a division of U.S. patent application Ser. No. 105,291, patented Nov. 17, 1989, U.S. Pat. No. 4,878,310 filed Oct. 5, 1987, which is assigned to the same assignee as this invention.

Many species of fish are frequently found in environments containing snags such as brush, stumps, sticks, rocks, weeds, grass, and other growing plants. To catch the fish located in such a habitat, it is necessary to cast or troll a fish bait close to or through the snags. A common result is that the bait becomes caught on a snag or that some part of the snag becomes caught on the hooks, thus rendering the lure ineffective for catching the fish. Many attempts have been made to provide fishing baits with hooks guards and other devices for preventing the baits from becoming entangled with snags. Such baits are commonly described as being "weedless". However, prior attempts to make fishing baits weedless suffer from the defects that they make it difficult to hook a striking fish, or they make the bait unattractive to the fish or difficult to cast or troll.

OBJECTIVES OF THE INVENTION

Accordingly, it is an object of our invention to provide an improved weedless fishing rig.

Another object is to provide megnetic methods of reducing the liklehood of snagging by a fish hook.

Another object is to provide a fishing bait that is easier to cast and less likely to snag.

Another object is to reduce the tendency of a fish hook to snag by magnetically attracting the hook into contact with a bait.

Another object is to employ magnetism in a way that permits the use of a single treble hook in place of a pair of such hooks on a fishing plug.

Another object is to provide a fishing bait with a magnetic weed guard that prevents the bait from turning upside down as it is retrieved among or over obstructions in the water.

Another object is to provide a weed guard that can be tripped by a fish striking from any angle with respect to the hook.

Another object is to provide a weed guard that does not creates an obstruction to striking of fish before or after the guard has been tripped by a strike Another object is to magnetically hold together a fish hook attached to a line and a lure body that separates from the hook when a fish strikes.

Another object is to improve the balance and swimming action of a fish lure by magnetically holding a swingable hook in contact with the fish lure.

Another object is to magnetically hold a weed guard against a fish hook.

Another object is to provide a magnetic weedless fishing bait that is durable, easy to cast or troll, highly attractive to fish, relatively inexpensive, and which does not possess defects found in similar prior art fishing baits.

Other objects and advantages of our invention will be found in the specification and claims, and the scope of the invention will be set forth in the claims.

DESCRIPTION OF THE DRAWINGS

FIG. 1 is a side view of an embodiment of our invention.

FIG. 2 is a cross sectional view of the embodiment shown in FIG. 1.

FIG. 3 is an end view of the embodiment shown in FIG. 1.

FIG. 4 is a cross sectional view taken along the line 4—4 in FIG. 1.

FIG. 5 is a side view of another embodiment of our invention.

FIG. 6 is a cross sectional view taken along the line 6—6 in FIG. 5.

FIG. 7 is a view of the underside of the embodiment of FIGS. 5 and 6.

FIG. 8 is a side view of another embodiment of our invention.

FIG. 9 is a side view of another embodiment of our invention.

FIG. 10 shows the embodiment of FIG. 9 with the hooks separated.

FIG. 11 is a side view of another embodiment of our invention.

FIG. 12 shows the embodiment of FIG. 11 with the weed guard sprung.

FIG. 13 is a side view of another embodiment of our invention.

FIG. 14 is a cross sectional view of the embodiment of FIG. 13.

FIG. 15 is an enlarged fragmentary view of the underside of the embodiment of FIG. 13 around cavity 60.

FIG. 16 is a fragmentary side view of the embodiment of FIGS. 13 and 14 showing the hook separated from the lure body.

DESCRIPTION OF THE INVENTION

FIGS. 1-4 show an embodiment of a magnetic fishing rig such as a bait 1 having an artificial floating plug body 2 with an eye 3 attached to a fishing line 4. A connector eye 5 protrudes from the underside of body 2, and a chain or strand 6 connects eyes 3 and 5. A double barb hook 7 has an eye 8 engaged with eye 5 so that the hook is pivotably attached to body 2. Hook 7 has a pair of identical side by side, straight shank portions 9 that both lie in essentialy the same plane as eye 8. Connector 5 is in a plane that is generally perpendicular to the plane of eye 8 and shank 9 when hook 7 is held against body 2 as described below. The tendency of hook 7 to snag is reduced by using magnetic means to attract the hook into contact with body 2. This may be accomplished by embedding a magnet 10 in the underside of body 2 closer to the rear end 11 than to the front end 12 of the body. Preferably, magnet 10 is made from a rare earth compound (e.g. summarian cobalt) because such rare earth magnets are relatively light and small in relation to their high magnetic strength and durability. Hook 7 may be made from a magnetizable material (e.g. stainless steel) that is magnetically attracted to magnet 10.

When hook 7 is pivoted from the free swing position shown in phantom in FIG. 1 to a position close to, or into contact with body 2, magnet 10 will hold the hook against the underside of body 2 with the hook barbs on opposite sides of the body closely adjacent to the body. The hook barbs will then be at least partially shielded from weeds and obstructions and are much less likely to snag than when hook 7 swings freely from connector 5.

When a fish strikes bait 1, the fish usually will contact some part of hook 7 and the force of the strike or the actions of the fisherman yanking on line 4 will ordinarily pull the hook away from magnet 10 and allow the barbs to sink into the fish's mouth. Hook 7 can be moved into contact with body 2 simply letting line 4 hang vertically downwardly from the fishing rod tip, since this will position both the hook 7 and plug body 2 essentially ninety degrees to the orientation shown in the drawing.

FIGS. 5–7 show another embodiment of the invention in which the fishing bait is an artificial diving plug 13 having a body 14 with a lip or diving vane 15. A connector 16 on the vane is tied to fishing line 17, and a connector eye 18 protrudes from the underside of body 14. A magnetized treble barbed hook 19 has a pair of side by side straight shank portions 20 that lie in essentially the same plane as its eye 21 and a third shank portion 22 that is attached to one surface of shank portions 20. Eye 21 is engaged with an S-hook 23 that is attached to eye 18 so that hook 19 is normally free swinging and can be pivoted into contact with the underside of body 14. Magnetic means 24, that is the same as described above with reference to FIGS. 1–4, is affixed as by gluing to the relatively even surfaces of shank portions 20 opposite to the surface where third shank portion 22 is attached. An object attracted to magnet 24, such as a flat head stainless steel screw 25, is imbedded in the underside of body 14 in line with eye 18. The attraction of magnet 24 to the head of screw 25 will move and hold hook 19 against body 14 in the manner previously described. Instead of gluing a magnet 24 to hook 19, it is also possible to subject hook 19 to a magnetic field until the hook is sufficiently magnetized to be attracted to and held against screw 25. Since hook 18 is treble barbed, it is more likely to snag than double barbed hook 7, but when hook 19 is in contact with body 14 it is much less likely to snag than if it were free swinging because the barbed points associated with shanks 20 will be held on opposite sides of the body 14 closely adjacent thereto, a generally shown in FIGS. 3 and 7. And the third barb 26 makes it more likely that a fish striking bait 13 will be hooked and caught.

Magnetically attracting hook 19 to body 14 also makes it possible to eliminate the second treble hook that is usually attached at the tail end 27 of diving plug 13. Instead of using two relatively small hooks, one attached at tail end 27 and the other at eye 18, only the relatively large hook 19 is used. The barbs of hook 19 are positioned close to tail end 27 by using S-hook 23 to couple hook 19 to eye 18. The loops 28 and 29 of S-hook 23 are located in planes that intersect at essentially right angles to each other to ensure that the relatively even surface of shank portions 20 opposite to shank portion 22 will face the underside of body 14 and hook 19 will also be free swinging when it is not magnetically attached to body 14. When being retrieved, diving plugs like 13 usually swim through the water with their central axis tilted downwardly at a steep angle to the horizontal (e.g. 30 to 60 degrees). This engagables the body 14 of the plug and vane 15 to effectively shield the downwardly extending barb 26 when the hook is magnetically held against body 14.

FIG. 8 shows another embodiment in which a bait 30 has a synthetic plastic body 31 shaped like a worm. A single barbed hook 32 has an eye 33 tied to a fishing line 34 that has been threaded through the front end 35 of the bait. Line 34 is flexible and allows hook 32 to swing free from body 31. Magnetic means 36, that is the same as described above with reference to FIGS. 1–4, is embedded in body 31 and holds hook 32 against the bait as previously described. The single barb hook 32 magnetically held against worm body 31 is not likely to snag and will hook striking fish more often than the so called Texas rigged weedless worms in which the hook barb is imbedded and concealed within the worm body. A double or triple barbed hook could also be used.

FIGS. 9 and 10 show another embodiment in which a pair of essentially identical magnetizable first and second hooks 40 and 41 are magnetically held in contact with each other in a manner that enables each hook to act as a weed guard for the other. The eyes 42 and 43 of the hooks are loosely and movably connected by a split ring 44, or other conventional means, that is tied to a fishing line 45. A magnet 46, as described with reference to FIGS. 1–4, may be glued to the shank of one of the hooks, or one or both of the hooks may be magnetized. When a rare earth magnet is attached to the shank of a hook, the entire hook acts like a magnet. The straight shank portions 47 and 48 are separated, and the curved bends 49 and 50 contact each other in opposed overlapping relationship in such a manner that each bend 49 and 50 acts as a weed guard for the barbed point 51 or 52 of the other hook. The magnetic force holding hooks 40 and 41 together is easily overcome by the bite of a fish, which will separate the hooks as shown in FIG. 10 and enable the fisherman to impale the fish.

FIGS. 11 and 12 show another embodiment in which magnetism is used to hold a weed guard 55 in contact with a hook 56. Guard 55 may be made from wire bent into an elongated loop having a first bend 57 at one end, a pair of relatively straight sides 58 and 59, and a second bend 60 at the other end. Bend 60 passes thru eye 61 of the hook 56. A magnet 62, as described with reference to FIGS. 1–4, may be glued to guard 55 adjacent bend 57. The magnet holds guard 55 in a position where sides 58 and 59 extend from eye 61 ahead of the curved bend 63 of the hook on both sides of barbed point 64, thus reducing the liklehood of the hook snagging. When a fish strikes, magnet 62 is pushed or falls out of contact with the hook, as shown in FIG. 12, thus exposing point 64 for hooking the fish. Instead of using a magnet 62 attached to guard 55, it is also possible to magnetize either guard 55 or hook 56, or both of them.

FIGS. 13–16 show another embodiment of which an artificial fishing bait 65 has a floating body 66 that swims or dives. Body 66 has a straight passage 67 extending from its underside 68 to a higher side or end 69. A larger semicircular cavity 70 is connected to passage 67 at underside 68. The fishing line 72 used by the angler passes through passage 67 and is tied to a ring 73 that defines the connector eye for this embodiment. Ring 73 is removably received in cavity 70 so that the ring will have a predetermined fixed orientation with respect to body 66. A magnet 74, as described with reference to FIGS. 1–4, is imbedded in the underside of body 66. A treble hook 75 has its eye 76 connected to ring 73, and its side by side straight shank portions 77 are in essentially the same plane as eye 76. The other shank portion 78 of hook 75 is attached to one side of shank portions 77, and the other relatively even sides of shank portions 77 may be held against, or close to, the underside of body 66 by magnet 74. When ring 73 is in cavity 70, the ring is held in a predetermined plane generally perpendicular to eye 76, and this orients hook eye 76 so that the relatively even sides of shank portions 77 opposite to shank portion 78 will be against or near body 66; this will cause the barbed points associated with shanks 77 to be held on opposite sides of body 66 closely adjacent thereto, as generally shown in FIGS. 3 and 7, where the hooks are less likely to snag than when they are free swinging. When a fish strikes, hook 75 will be jarred loose from magnet 74 where it can impale the fish if the angler reacts properly. Ring 73 will be pulled out of cavity 70 and lure body 66 can then float free from the hooked fish where the body will not interfere with the angler's efforts to catch the fish, and where the body can float to the surface and be retrieved if the fish breaks line 72.

Our invention also includes a method of reducing the liklihood of snagging by a fish hook. A hook 7, 19, 32, or 75 is movably attached to a fishing bait in such a manner that the hook is essentially free swinging. Each hook is magnetically attracted and held by a magnet 10, 24, 36, or 74 in contact with, or close to, the underside of the bait where it is less likely to snag than when it is free swinging. Also, hooks 45 and 41, and hook 56 and guard 55, are held by magnetic force in positions that shield them from snags. In addition to embedding a magnet 10, 36, or 74 in the body 2, 31 or 66 of a fishing lure, this method may be practiced by making the body of the lure from a magnetizable material such as a metal alloy, that has been magnetized sufficiently to hold a hook in contact with it, or both the lure body and the hook may be magnetized to attract each other. Also, a magnet such as 24, may be attached to any of the hooks, or the hooks themselves may be magnetized sufficiently, to move and hold the hooks against any of the lure bodies or against another hook 40 or 41 or a hook guard 55.

It has thus been shown that by the practice of our invention, magnetism can be used to move or hold a fish hook in a first position where it is at least partially shielded by a bait or another hook and thus is less likely to snag. This use of magnets does not interfere with the natural appearance or action of the baits, and magnetically holding a free swinging hook in contact with the underside of a plug improves its swimming action. Also, when the hook is magnetically held in contact with a fishing lure body, the lure is easier to cast. Imbedding a magnetic weed guard 10, 36, or 74 in the underside of a fishing lure 1, 30, or 65 lower its center of gravity and thus helps to prevent the lure from turning upside down as it is retrieved over obstructions. A single relatively large treble hook 19 can be used in place of a pair of smaller treble hooks by eliminating the tail hook and employing an S-hook 23 to locate the hook barbs adjacent tail end 27, when the hook is magnetically held in contact with the lure body 14. The hooks 40 and 41 act as weed guards for each other, and they are moved out of the way by a fish striking from any angle, and similarly magnetic weed guard 55 is tripped by a fish striking from any angle. Also, after magnetic guard 55 has been tripped, or hooks 40 and 41 have been separated, they move to a second portion out of the way and do not act as obstructions to the hooking of the fish, as do spring type and other common weed guards. The use of magnet 74 to hold hook 75 against lure body 66 also prevents body 66 from floating up line 72 away from the hook if the lure is retrieved with a jigging or jerking type movement or if the lure is retrieved in a stop and go manner.

While our invention has been described with reference to particularly embodiments, we do not intended to illustrate or described herein all of the equivalent forms or ramifications thereof. For example, our invention is applicable to harnesses and other rigs for live or natural baits with movable hooks that use magnets or that have been magnetized so as to move or hold a hook in a location where it is less likely to snag. Also, the words used are words of description rather than limitation, and various changes may be made without departing from the spirit or scope of our invention disclosed herein. It is intended that the appended claims cover all such changes as fall within the true spirits and scope of our invention.

We claim:

1. A fishing rig comprising a fish hook made from a magnetizable material, said fish hook having a point for impailing fish, weed guard means operatively connected to said fish hook, said weed guard means being movable from a first position in contact with said fish hook that guards said point to a second position that exposes said point, and magnetic means for holding said weed guard means in said first position.

2. The invention defined in claim 1, wherein said weed guard means comprises a second fish hook made from a magnetizable material.

3. The invention defined in claim 1, wherein said weed guard means comprises wire means made from a magnetizable material.

4. The invention defined in claim 3, wherein said wire means has been magnetized.

5. The invention defined in claim 3, wherein said fish hook has been magnetized.

6. The invention defined in claim 3, wherein said wire means comprises a magnet attached thereto.

7. The invention defined in claim 3, wherein said fish hook has an eye, and said wire means comprises a wire bent into an elongated loop having a first bend at one end, a pair of relatively straight sides, and a second bend at its other end, said second bend passing through said eye for movably and loosely connecting said weed guard to said hook, said magnetic means holding said straight sides on opposite sides of said point when said weed guard is in said first position.

8. The invention defined in claim 2, wherein said second fish hook has been magnetized.

9. The invention defined in claim 2, wherein said second fish hook comprises a magnet attached thereto.

10. The invention defined in claim 2, wherein both of said fish hooks have been magnetized.

11. The invention defined in claim 2, wherein said hooks each comprise an eye, a straight shank portion, and a curved bend terminating in a barbed point, said hooks are connected at their eyes in an opposed relationship with the pointed and barb of each hook overlapping and contacting the curved bend of the other hook in such a manner that the curved bend of each hook acts as a weed guard for the point and barb of the other hook, and said hooks are magnetically held in such overlapping contact until they are separated by the strike of a fish.

12. The invention defined in claim 10, wherein both said fish hook and said wire means have been magnetized.

13. The method of reducing the likelihood of snagging by a fish hook comprising magnetically holding a weed guard in a position adjacent said fish hook.

14. The invention defined in claim 13, further comprising making said fish hook from a magnetizable material, and attaching a magnet to said weed guard.

15. The invention defined in claim 13, further comprising holding said weed guard in contact with said fish hook.

16. The invention defined in claim 13, further comprising making both said fish hook and said weed guard from magnetizable material.

17. The invention defined in claim 16, further comprising magnetizing said fish hook.

18. The invention defined in claim 16, further comprising magnetizing said weed guard.

19. The invention defined in claim 16, further comprising magnetizing both said fish hook and said weed guard.

20. The invention defined in claim 16, further comprising magnetizing a second fish hook, and placing said second fish hook in contact with said fish hook.

21. The invention defined in claim 16, further comprising providing said fish hook with an eye and movably connecting said weed guard to said eye.

* * * * *

UNITED STATES PATENT AND TRADEMARK OFFICE
CERTIFICATE OF CORRECTION

PATENT NO. : 4,922,645

DATED : May 8, 1990

INVENTOR(S) : Douglas Hannon, et al

It is certified that error appears in the above-identified patent and that said Letters Patent is hereby corrected as shown below:

On the title page, item [75]:
The address of co-inventor McClellan should be Eustis, Florida.

In column 2, in line 47, after "Connector" --eye-- should be inserted.

In column 3, in line 41, "a" should be --as--.

In column 3, in lines 59 and 60, "horizontal" should be --horizon--.

In column 3, in line 60, "engagables" should be to --enables--.

In column 4, in line 36, after "56" and before the ".", --and loosely and movably connects guard 55 to hook 56-- should be inserted.

In column 5, in line 46, "lower" should be --lowers--.

In column 5, in line 59, "portion" should be --position--.

UNITED STATES PATENT AND TRADEMARK OFFICE
CERTIFICATE OF CORRECTION

PATENT NO. : 4,922,645

DATED : May 8, 1990

INVENTOR(S) : Douglas Hannon, et al.

It is certified that error appears in the above-identified patent and that said Letters Patent is hereby corrected as shown below:

In column 6, in line 11, "spirits" should be --spirit--.

Signed and Sealed this

Ninth Day of July, 1991

Attest:

*Attesting Officer*

HARRY F. MANBECK, JR.

*Commissioner of Patents and Trademarks*